United States Patent
Ohno et al.

(10) Patent No.: US 8,904,896 B2
(45) Date of Patent: Dec. 9, 2014

(54) GEAR DEVICE

(75) Inventors: Masao Ohno, Hirakata (JP); Junichi Matsui, Kyotanabe (JP); Terumasa Imajyou, Hirakata (JP); Masahiko Ishiyama, Hirakata (JP)

(73) Assignee: Komatsu Ltd., Tokyo (JP)

( * ) Notice: Subject to any disclaimer, the term of this patent is extended or adjusted under 35 U.S.C. 154(b) by 420 days.

(21) Appl. No.: 13/319,714

(22) PCT Filed: May 10, 2010

(86) PCT No.: PCT/JP2010/057867
§ 371 (c)(1),
(2), (4) Date: Dec. 12, 2011

(87) PCT Pub. No.: WO2010/131617
PCT Pub. Date: Nov. 18, 2010

(65) Prior Publication Data
US 2012/0085192 A1    Apr. 12, 2012

(30) Foreign Application Priority Data
May 13, 2009 (JP) ................................ 2009-116790

(51) Int. Cl.
*F16H 55/14* (2006.01)
*F16H 55/06* (2006.01)
*F16H 48/08* (2006.01)
*F16H 1/46* (2006.01)
*E02F 9/20* (2006.01)
*F16H 57/08* (2006.01)
*F16H 57/04* (2010.01)

(52) U.S. Cl.
CPC *F16H 1/46* (2013.01); *E02F 9/202* (2013.01); *F16H 57/082* (2013.01); *F16H 57/0479* (2013.01)
USPC ................. 74/434; 74/411; 475/230

(58) Field of Classification Search
CPC ... F16H 48/08; F16H 48/40; F16H 2048/085; F16H 2048/082; F16H 2048/385; F16H 2048/387; F16H 48/11
USPC ........ 74/434, 606 R, 607, 410, 411; 475/230, 475/231, 220, 238, 233, 236, 331
See application file for complete search history.

(56) References Cited

U.S. PATENT DOCUMENTS 4,700,583 A * 10/1987 Hicks .............................. 74/410
5,304,103 A * 4/1994 Schlosser ...................... 475/230
(Continued)

FOREIGN PATENT DOCUMENTS

| JP | 4-56251 U | 5/1992 |
| JP | 6-159353 A | 6/1994 |

(Continued)

OTHER PUBLICATIONS

Japanese Office Action issued on Jul. 2, 2013 for the corresponding Japanese application No. 2009-116790.

(Continued)

*Primary Examiner* — Troy Chambers
*Assistant Examiner* — Jude Agendia
(74) *Attorney, Agent, or Firm* — Global IP Counselors, LLP (57) ABSTRACT

A gear device includes a gear, a pin, a plate member, a retainer portion, a contact part and a non-contact part. The pin is inserted into an opening of the gear. The plate member is disposed on a face of the gear and attached along an outer peripheral surface of the pin. The retainer portion is disposed in a vicinity of an end portion of the pin, with the plate member being interposed between the retainer portion and the face of the gear. The contact part is formed by faced surfaces of the retainer portion and the plate member with parts of the faced surfaces annularly making contact in a position closest to an outer peripheral surface of the pin. The non-contact part is formed by the faced surfaces with parts of the faced surfaces not making contact in a position away from the outer peripheral surface of the pin.

14 Claims, 10 Drawing Sheets

(56) References Cited

U.S. PATENT DOCUMENTS

| | | | |
|---|---|---|---|
| 5,857,936 A | 1/1999 | Ishikawa | |
| 5,951,431 A * | 9/1999 | Downs et al. | 475/230 |
| 6,066,063 A | 5/2000 | Ishikawa | |
| 6,618,924 B1 * | 9/2003 | Irwin | 29/407.05 |
| 6,645,113 B2 * | 11/2003 | Orr et al. | 475/230 |
| 6,702,707 B2 * | 3/2004 | Krzesicki et al. | 475/230 |
| 7,025,702 B2 * | 4/2006 | Saito et al. | 475/160 |
| 7,367,914 B2 * | 5/2008 | Rosochacki et al. | 475/230 |
| 8,308,602 B2 * | 11/2012 | Hicks | 475/331 |
| 8,376,902 B2 * | 2/2013 | Fox et al. | 475/347 |
| 8,535,191 B1 * | 9/2013 | Gall et al. | 475/160 |
| 2004/0192488 A1 * | 9/2004 | Prucher | 475/230 |
| 2010/0062892 A1 * | 3/2010 | Vogel et al. | 475/230 |
| 2010/0077881 A1 * | 4/2010 | Hicks | 74/411 |

FOREIGN PATENT DOCUMENTS

| | | |
|---|---|---|
| JP | 9-89075 A | 3/1997 |
| JP | 10-47456 A | 2/1998 |
| JP | 10-311403 A | 11/1998 |
| JP | 2000-337292 A | 12/2000 |
| JP | 2001-65569 A | 3/2001 |
| JP | 2004-340330 A | 12/2004 |
| JP | 2009-79627 A | 4/2009 |
| KR | 10-1998-0017486 A | 6/1998 |
| KR | 10-2009-0039380 A | 4/2009 |

OTHER PUBLICATIONS

International Search Report of corresponding PCT Application No. PCT/JP2010/057867.

* cited by examiner

GEAR DEVICE

CROSS-REFERENCE TO RELATED APPLICATIONS

This national phase application claims priority to Japanese Patent Application No. 2009-116790 filed on May 13, 2009. The entire disclosure of Japanese Patent Application No. 2009-116790 is hereby incorporated herein by reference.

TECHNICAL FIELD

The present invention relates to a gear device configured to rotate gears about roughly cylindrical pins that the gears are attached along and onto the outer peripheral surfaces thereof.

BACKGROUND ART

In the planetary gear mechanisms mounted in devices such as the speed reducers, multiple planet gears are meshed with a sun gear while being rotatably supported by a carrier, respectively. With the structure, such a mechanism is formed that the planet gears revolve about the sun gear while rotating about the axes thereof.

For example, Japan Laid-open Patent Application Publication No. JP-A-2009-079627 (disclosed on Apr. 16, 2009) describes a structure of a speed reducer provided with a planetary gear mechanism immersed into lubricating oil. In the planetary gear mechanism, each of planet gears is attached along and onto the outer peripheral surface of a planet shaft (pin) through a bearing. Further, a washer (plate member) and a C-shaped snap ring (retainer portion) are attached onto the upper end portion of the planet shaft for fixing each planet gear onto the planet shaft.

SUMMARY

However, the aforementioned well-known planetary gear mechanism has the following drawback.

Specifically in the planetary gear mechanism described in the Japan Laid-open Patent Application Publication No. JP-A-2009-079627, each planet gear is fixed onto the planet shaft using the washer and the C-shaped snap ring. When the washer is rotated in conjunction with gear rotation, the washer and the C-shaped snap ring are rotated relatively to each other while the contact surfaces thereof entirely make contact with each other. Therefore, the opening of the C-shaped ring may be extended and the C-shaped ring may be thereby detached from the planet shaft or the C-shaped ring may be thermally deformed in the relative rotation with the washer during gear rotation. Then, thus detached component may cause troubles.

It is an object of the present invention to provide a gear device for preventing occurrence of troubles due to detachment, burning-out and so forth of a retainer member in conjunction with gear rotation.

A gear device according to a first aspect of the present invention includes a gear including an opening in a center part thereof, a roughly cylindrical pin, a roughly annular plate member, a retainer portion and a contact part. The roughly cylindrical pin is inserted along and into the opening of the gear and functions as a rotational center of the gear. The roughly annular plate member is attached along and onto an outer peripheral surface of the pin while being disposed on a face of the gear. The retainer portion is disposed in a vicinity of an end portion of the pin, with the plate member being interposed between the retainer portion and the face of the gear. The contact part is formed by faced surfaces of the retainer portion and the plate member in an axial direction of the pin. The faced surfaces of the contact part annularly make contact with each other in a position closer to an outer peripheral surface of the pin.

According to the gear device of the first aspect of the present invention, the plate member and the retainer portion, attached for fixing the gear onto the end portion of the pin functioning as the rotational shaft of the gear, include the contact part formed by the faced surfaces thereof only partially making contact with each other.

In such gear devices as described above, the plate member may be rotated in conjunction with gear rotation and is thus slid along the retainer portion. This may cause a variety of troubles such as detachment of the retainer portion and deformation or burning-out of the retainer portion by means of sliding heat. It should be noted that the term "faced surfaces" refers to the faced surfaces of the plate member set on the face of the gear; and the retainer portion attached onto the end portion of the pin.

In view of the above, the gear device of the present invention employs the structure that the faced surfaces partially make contact with each other only in the radial inner portions thereof in order to reduce the contact area between the plate member and the retainer portion.

With the structure, it is possible to reduce rotational moment to be applied to the retainer portion in gear rotation compared to that in the well-known structure that the faced surfaces entirely make contact with each other in gear rotation. It is thereby possible to prevent occurrence of troubles such as detachment, thermal deformation and burning-out of the retainer portion. Consequently, it is possible to enhance lubricating performance and simultaneously resolve problems such as locking of the gear device due to detachment of the plate member held by the retainer portion.

A gear device according to a second aspect of the present invention relates to the gear device according to the first aspect of the present invention. In the gear device, one of the contacted faced surfaces of the plate member and the retainer portion includes a slanted surface slanted with respect to the other of the contacted faced surfaces thereof.

According to the gear device of the second aspect of the present invention, the contact part of the gear fixing members (i.e., the plate member and the retainer portion) is characterized in the shape thereof that one of the faced surfaces includes a tapered slanted surface slanted with respect to the other thereof.

Accordingly, it is possible to cause the faced surfaces to only partially make contact with each other without entirely making contact with each other. Therefore, it is possible to reduce rotational force to be applied to the retainer portion due to relative rotation between the plate member and the retainer portion when the plate member is rotated in conjunction with gear rotation. Consequently, it is possible to prevent troubles such as detachment and deformation of the retainer portion.

A gear device according to a third aspect of the present invention relates to the gear device according to the second aspect of the present invention. In the gear device, the slanted surface is formed on the retainer-portion-side one of the faced surfaces of the retainer portion and the plate member.

According to the gear device of the third aspect of the present invention, the slanted surface, formed on either of the faced surfaces of the plate member and the retainer portion, is specifically formed on the retainer-portion-side one of the faced surfaces of the plate member and the retainer portion.

Accordingly, it is possible to reduce the contact area between the faced surfaces in the contact part of the retainer portion and the plate member, compared to the structure with entirely contacted faced surfaces. In other words, it is possible to reduce load to be applied to the retainer portion. Consequently, it is possible to prevent occurrence of troubles such as detachment and deformation of the retainer portion.

A gear device according to a fourth aspect of the present invention relates to the gear device according to the second aspect of the present invention. In the gear device, the slanted surface is formed on the plate-member-side one of the faced surfaces of the retainer portion and the plate member. The slanted surface is downwardly slanted from inside to outside in a radial direction of the plate member.

According to the gear device of the fourth aspect of the present invention, the slanted surface, formed on either of the faced surfaces of the plate member and the retainer portion, is specifically formed on the plate-member-side one of the faced surfaces of the plate member and the retainer portion. Further, the slanted surface is downwardly slanted from inside to outside in the radial direction of the plate member.

Accordingly, it is possible to reduce the contact area between the faced surfaces in the contact part of the retainer portion and the plate member, compared to the structure with entirely contacted faced surfaces. In other words, it is possible to reduce load to be applied to the retainer portion. Consequently, it is possible to prevent occurrence of troubles such as detachment and deformation of the retainer portion.

A gear device according to a fifth aspect of the present invention relates to the gear device according to the first aspect of the present invention. In the gear device, at least one of the contacted faced surfaces of the plate member and the retainer portion includes a convex portion.

According to the gear device of the fifth aspect of the present invention, the faced surfaces of the plate member and the retainer portion make contact with each other through the convex portion.

Accordingly, it is possible to reduce the contact area between the faced surfaces in the contact part of the retainer portion and the plate member, compared to the structure with entirely contacted faced surfaces. In other words, it is possible to reduce load to be applied to the retainer portion. Consequently, it is possible to prevent occurrence of troubles such as detachment and deformation of the retainer portion.

A gear device according to a sixth aspect of the present invention relates to the gear device according to one of the first to fifth aspects of the present invention. In the gear device, at least one of the contacted faced surfaces of the plate member and the retainer portion includes a recess as an oil reservoir.

According to the gear device of the sixth aspect of the present invention, a recess having a dented or grooved shape, for instance, is formed in the contact portion between the faced surfaces of the plate member and the retainer portion. Specifically, the aforementioned recess may be herein formed on either or both of the plate member and the retainer portion.

Accordingly, it is possible to enhance lubricating performance on the contacted surfaces of the plate member and the retainer portion.

A gear device according to a seventh aspect of the present invention relates to the gear device according to the sixth aspect of the present invention. In the gear device, the recess is at least one of the group comprising: a twill mark to be formed in grinding; a lathe machining groove; and a shot peening mark.

According to the gear device of the seventh aspect of the present invention, either one of or combination of the group including a twill mark to be formed in grinding, a lathe machining groove and a shot peening mark is used as the recess formed on the surface of the retainer portion faced to that of the plate member.

Accordingly, it is possible to produce a clearance between the contacted surfaces of the plate member and the retainer portion for holding the oil therein. In other words, lubricating performance therein can be enhanced.

A gear device according to an eighth aspect of the present invention relates to the gear device according to one of the first to seventh aspects of the present invention. In the gear device, the retainer portion is a flanged portion. The flanged portion is integrally formed with the end portion of the pin while being protruded outwards in a radial direction of the pin.

According to the gear device of the eighth aspect of the present invention, the flanged portion, integrally formed with and radial-outwardly protruded from the end portion of the pin, is used as the retainer portion.

Accordingly, it is further effectively prevent occurrence of troubles such as detachment and thermal deformation of the retainer portion even when the plate member is rotated in conjunction with gear rotation.

A gear device according to a ninth aspect of the present invention relates to the gear device according to one of the first to seventh aspects of the present invention. In the gear device, the retainer portion is a ring member to be attached to a vicinity of the end portion of the pin by means of elastic deformation.

According to the gear device of the ninth aspect of the present invention, the ring member to be attached to the pin by means of elastic deformation (e.g., a C-shaped snap ring) is used as the retainer portion.

Accordingly, it is possible to reduce the contact area between the retainer portion and the plate member in relative rotation thereof even when the aforementioned normal ring member is used as the retainer portion. Consequently, it is possible to prevent occurrence of troubles such as detachment and thermal deformation of the ring member.

A gear device according to a tenth aspect of the present invention relates to the gear device according to the eighth aspect of the present invention. In the gear device, the pin includes a thermally processed hardened layer in a region of the flanged portion. The region herein includes the flanged-portion-side one of the faced surfaces of the flanged portion and the plate member.

According to the gear device of the tenth aspect of the present invention, the thermally processed hardened layer is formed on a region of the pin that includes the flanged-portion-side one of the faced surfaces of the flanged portion and the plate member.

The aforementioned thermally processed hardened layer herein includes a hardened layer processed by means of high frequency heating, carburizing and carbo-nitriding.

Accordingly, it is possible to enhance the surface strength of the surface of the flanged portion contacted with the surface of the plate member.

A gear device according to an eleventh aspect of the present invention relates to the gear device according to the tenth aspect of the present invention. In the gear device, the plate member includes a hardened layer on the plate-member-side one of the contacted faced surfaces of the plate member and the flanged portion. The hardened layer of the plate member herein has a characteristic different from that of the thermally processed hardened layer of the flanged portion.

According to the gear device of the eleventh aspect of the present invention, the hardened layer, processed by means of surface finishing with a characteristic different from that of the surface finishing executed for the flanged portion, is formed on the plate-member side one of the faced surfaces of the plate member and the flanged portion, which includes a surface hardened layer processed by, for instance, high frequency heating or carburizing.

It is herein possible to assume a hardened layer processed by means of salt bath nitriding, gas soft nitriding or the like as an example of the aforementioned hardened layer of the plate member. Accordingly, it is possible to prevent occurrence of troubles such as adhesion of the closely contacted portions of the faced surfaces in the contact part in gear rotation.

A gear device according to a twelfth aspect of the present invention includes a gear having an opening in a center part thereof, a roughly cylindrical pin, a roughly annular plate member and a recess. The roughly cylindrical pin is inserted along and into the opening of the gear and functions as a rotational center of the gear. Further, the pin includes a flanged portion on an end portion thereof. The flanged portion is protruded outwards in a radial direction of the pin. The roughly annular plate member is disposed on a face of the gear and is simultaneously attached along and onto an outer peripheral surface of the pin. The plate member is fixed by the flanged portion. The recess is formed on a surface of the flanged portion faced to a surface of the plate member.

According to the gear device of the twelfth aspect of the present invention, a recess having a dented or grooved shape, for instance, is formed in the contact part of the plate member and the retainer portion that are attached for fixing the gear to the end portion of the pin functioning as the rotational axis of the gear.

The aforementioned recess may be herein formed on either or both of the plate member and the retainer portion. Further, it is possible to select and use as the recess, for instance, any one of the group including a twill mark to be formed in grinding, a lathe machining groove and a shot peening mark.

Accordingly, it is possible to produce a clearance for holding the oil on the surface of the retainer portion contacted with the surface of the plate member. Consequently, lubricating performance on the contacted surfaces can be enhanced by the existence of the oil held in the recess.

DESCRIPTION OF THE EMBODIMENTS

A gear device according to an exemplary embodiment of the present invention will be hereinafter explained with reference to FIGS. 1 to 7.

Overall Structure of Hydraulic Excavator 1

Figure 1:
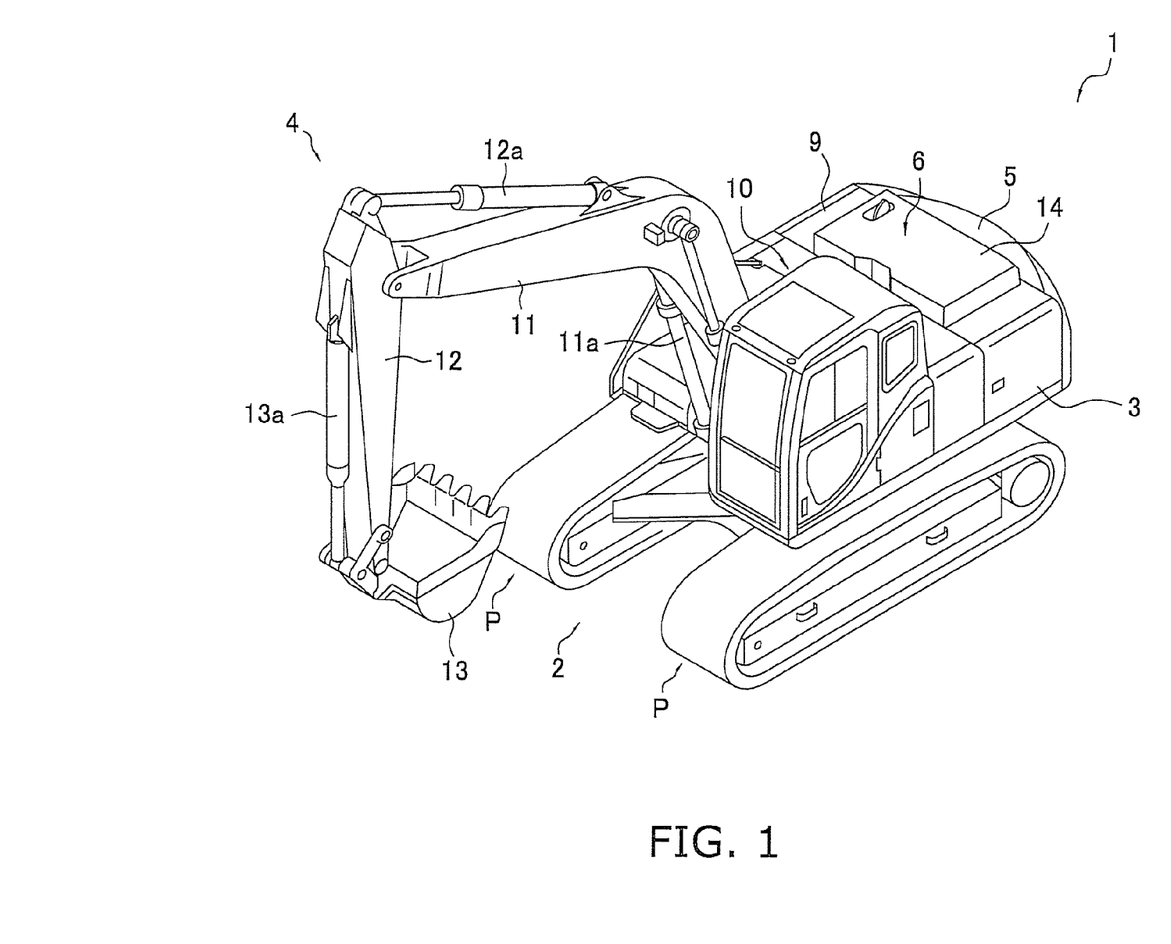
FIG. 1 is a perspective view of a structure of a hydraulic excavator embedded with a revolving motor including a planetary gear mechanism according to an exemplary embodiment of the present invention.

As illustrated in FIG. 1, a hydraulic excavator 1 according to the present exemplary embodiment includes a lower travelling unit 2, a revolving base 3, a working unit 4, a counterweight 5, a vehicle body part 6, a machine compartment 9 and a cab 10.

The lower traveling unit 2 is configured to circulate a pair of tracks (crawler belts) P wrapped around the transverse end portion thereof disposed perpendicular to a travel direction for moving the hydraulic excavator 1 back and forth. Further, the lower traveling unit 2 is provided with the revolving base 3 on the top side thereof while allowing the revolving base 3 to revolve thereon.

The revolving base 3 is allowed to revolve on the lower traveling unit 2 in an arbitrary direction by means of a revolving motor 20 to be described. The revolving base 3 is provided with the working unit 4, the counterweight 5, the vehicle body part 6 and the cab 10 on the top side thereof.

The working unit 4 includes a boom 11, an arm 12 attached to a distal end of the boom 11, and a bucket 13 attached to a distal end of the arm 12. The working unit 4 is configured to move components such as the boom 11, the arm 12 and the bucket 13 up and down by means of components (e.g., hydraulic cylinders 11a, 12a and 13a) included in a hydraulic circuit (not illustrated in the figures) for executing e.g., earth-sand excavation and sand-gravel excavation in earthmoving construction sites.

For example, the counterweight 5 is formed by solidifying materials (e.g., iron scrapes and concrete) put in a box formed by assembling steel plates. The counterweight 5 is disposed behind the vehicle body part 6 on the revolving base 3 for balancing the entire vehicle body of the hydraulic excavator 1 in executing excavation and the like.

As illustrated in FIG. 1, the vehicle body part 6 is disposed adjacent to the counterweight 5. The vehicle body part 6 includes an upper opening for inspection covered with an openable/closable engine hood 14. Further, the vehicle body part 6 accommodates components such as an engine (not illustrated in the figures) functioning as a power source for driving the lower travelling unit 2 and the working unit 4, a cooling core (not illustrated in the figures) and the revolving motor 20 to be described.

The machine compartment 9 is disposed behind the working unit 4 and accommodates components (not illustrated in the figures) such as a fuel tank, an operating oil tank and an operating valve.

The cab 10 includes an operating room where an operator of the hydraulic excavator 1 gets on and off. The cab 10 is disposed on a left front part on the revolving base 3 while being transversely adjacent to the working unit 4. The operator is thereby allowed to see the distal end of the working unit 4.

Revolving Motor 20

Figure 2:
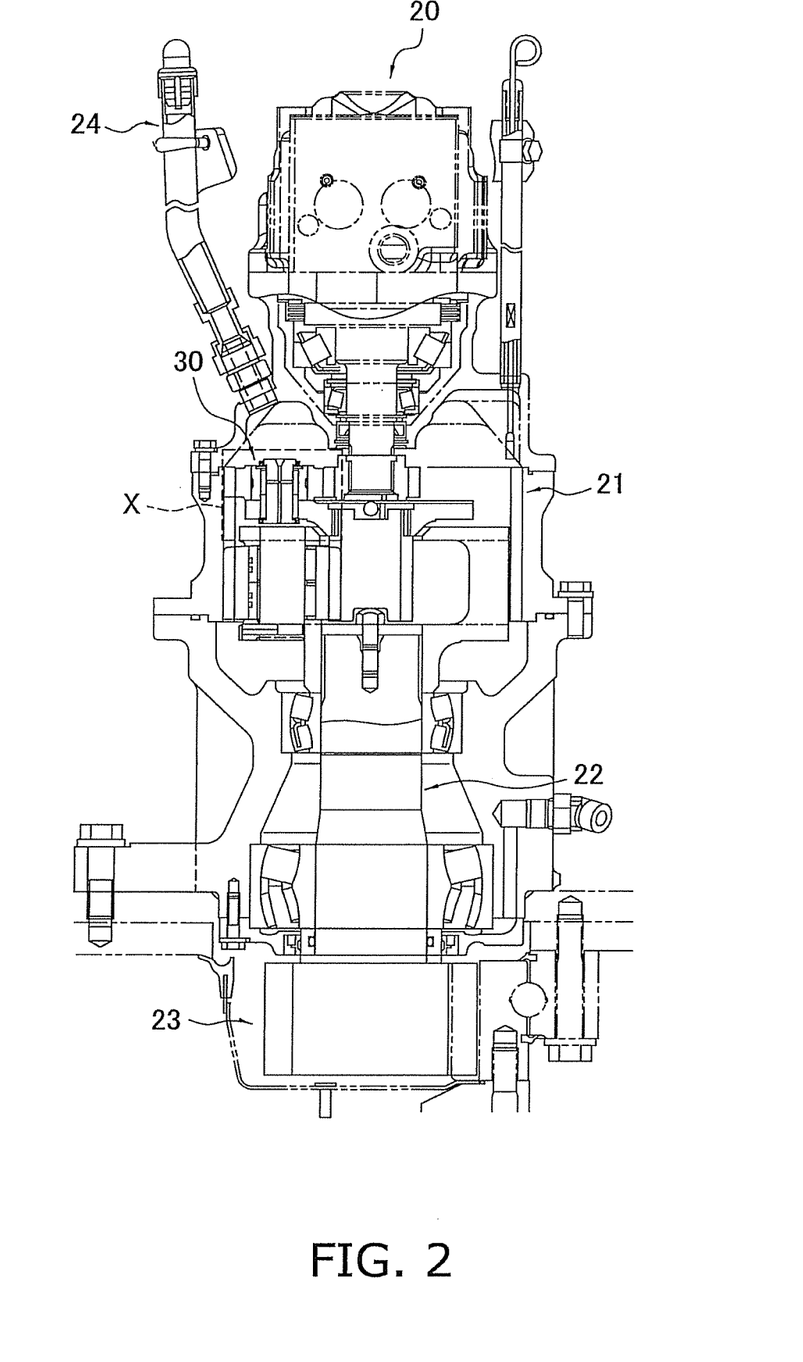
FIG. 2 is a front view of a structure of the revolving motor and its periphery mounted in the hydraulic excavator illustrated in FIG. 1.

The revolving motor 20 is disposed within the vehicle body part 6 while being disposed on the lower traveling unit 2. The revolving motor 20 is configured to revolve the aforementioned revolving base 3 in a desired direction. As illustrated in FIG. 2, the revolving motor 20 is provided with a fuel supply pipe 24 connected thereto, and is configured to rotate a pinion gear (not illustrated in the figures) through a speed reducer 21 and a revolving shaft 22 for revolving the revolving base 3 on the lower traveling unit 2.

Further, the revolving motor 20 accommodates a planetary gear mechanism 30 within the speed reducer 21 as illustrated in FIG. 2. The planetary gear mechanism 30 will be described in detail in the following paragraphs.

Planetary Gear Mechanism 30

Figure 3:
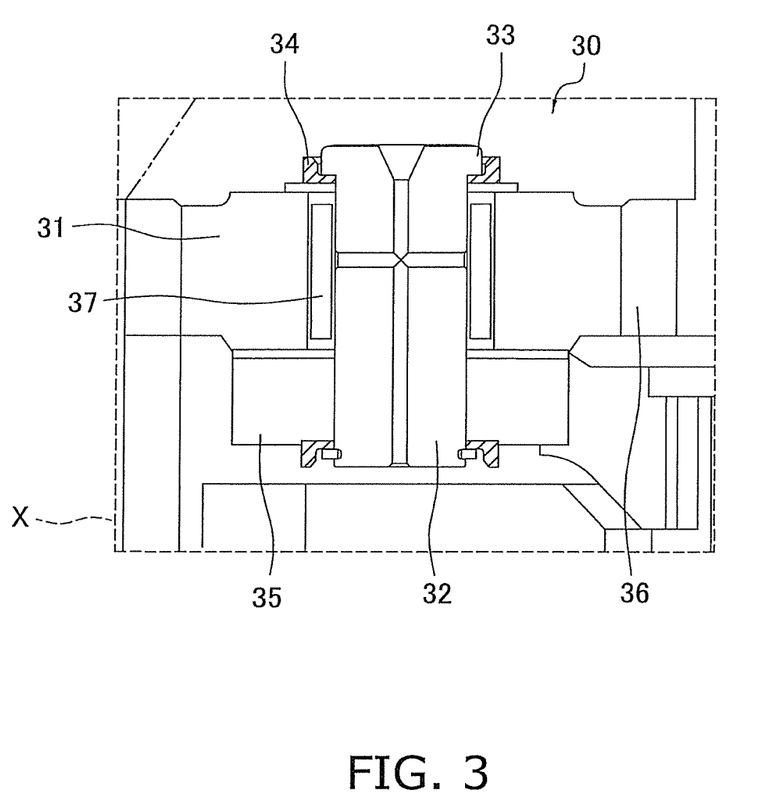
FIG. 3 is a partial cross-sectional view of a structure of the planetary gear mechanism within the revolving motor illustrated in FIG. 2.

As illustrated in FIG. 3, the planetary gear mechanism (gear device) 30 includes a plurality of planet gears (gears) 31, a plurality of pins 32, a plurality of flanged portions (retainer portion) 33, a plurality of plate members 34, a carrier 35, a sun gear 36 and a plurality of bearing portions 37.

As illustrated in FIG. 3, each planet gear 31 includes an opening in the center part thereof and each pin 32 is inserted into the opening. Accordingly, each planet gear 31 is configured to rotate about the pin 32. Further, the multiple planet gears 31 are disposed about the sun gear 36. The multiple planet gears 31 are rotatably connected to each other through the carrier 35. The multiple planet gears 31 are configured to revolve about the sun gear 36 while being configured to rotate about the pin 32.

Figure 4:
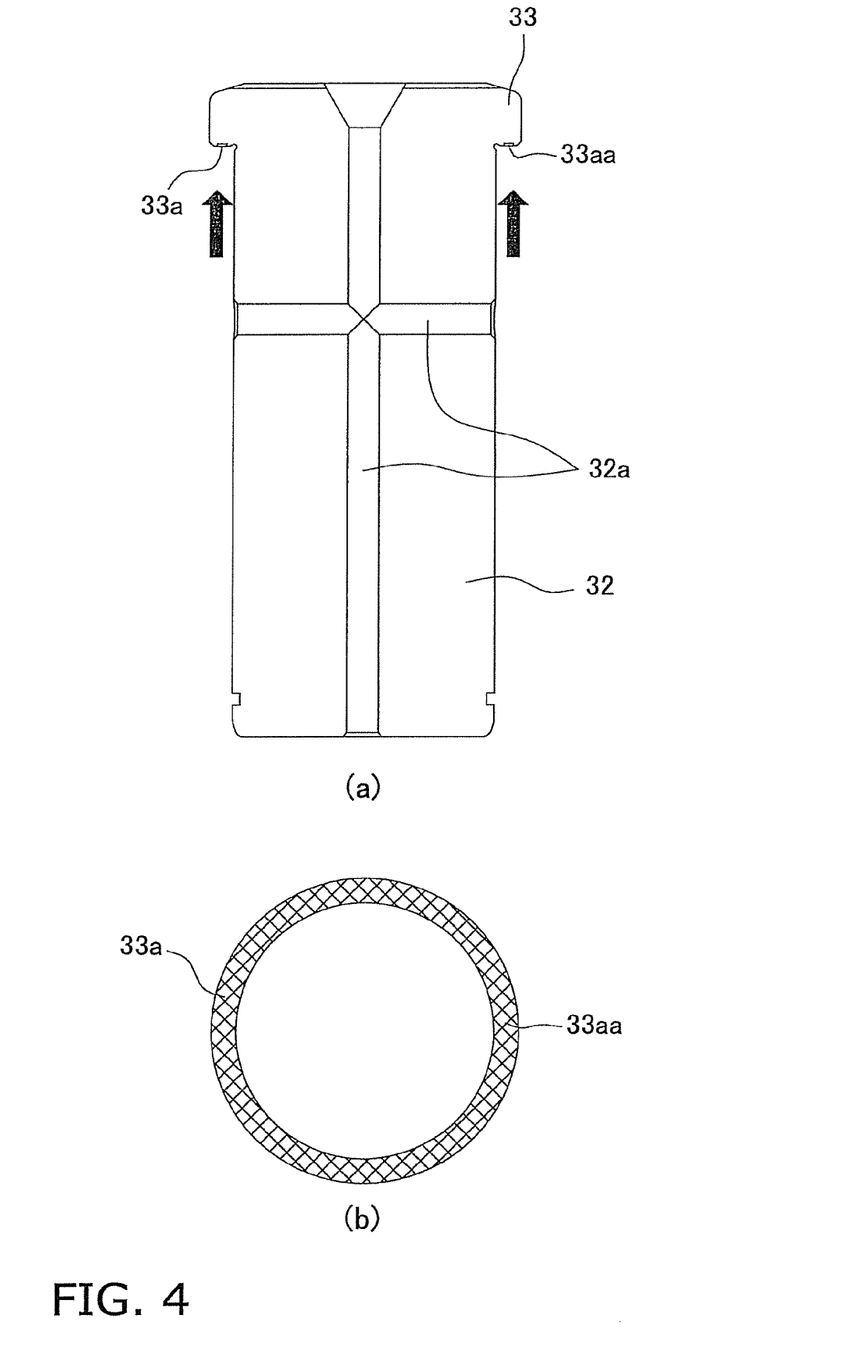
FIG. 4 includes a side view (a) illustrating a structure of a pin included in the planetary gear mechanism illustrated in FIG. 3 and a plan view (b) seen from a direction indicated by arrows in the side view (a).

As illustrated in FIG. 4(a), each pin 32 is a roughly cylindrical member and includes through holes 32a in the inside thereof for allowing oil to flow therethrough. Surface finishing is executed for each pin 32, specifically, an area including a contact surface 33a of the flanged portion 33 to be described. Each pin 32 is press-fitted into one of apertures formed in the carrier 35. A hardened layer is formed for each pin 32 by means of the surface finishing. Specifically, a thermally hardened layer is formed by means of high frequency heating. Alternatively, a hardened layer is formed by means of carbo-nitriding. It should be noted that the high frequency heating can be herein executed by electrifying a coil disposed along the outer peripheral surface of each pin 32. Further, each planet gear 31 is loaded on the outer peripheral surface of each pin 32 through the bearing portion 37 and a bearing holder 38.

As illustrated in FIG. 4 (a), each flanged portion 33 is a brim member integrally formed with the upper end portion of each pin 32. The flanged portion 33 is protruded radial outwards and thus forms a large diameter portion. Further, each flanged portion 33 includes the contact surface 33a. The contact surface 33a makes contact with each plate member 34 while each pin 32 is inserted into each planet gear 31. The contact surface 33a is formed on the flanged portion 33 protruded from the outer peripheral surface of each pin 32, while being disposed roughly perpendicular to an insertion direction of each pin 32. In the present exemplary embodiment, the contact surface 33a includes a recess 33aa for easily accumulating oil as illustrated in FIG. 4 (b). For example, an element to be used as the recess 33aa includes a twill mark to be formed in grinding the outer periphery of each pin 32, a coaxial or spiral groove by means of lathe machining, or a processed mark by means of shot peening. It is possible to enhance lubricating performance between the contact surface 33a of the flanged portion 33 and the surface of a tapered portion 34a of the plate member 34 by keeping the oil in the recess 33aa.

Figure 5:
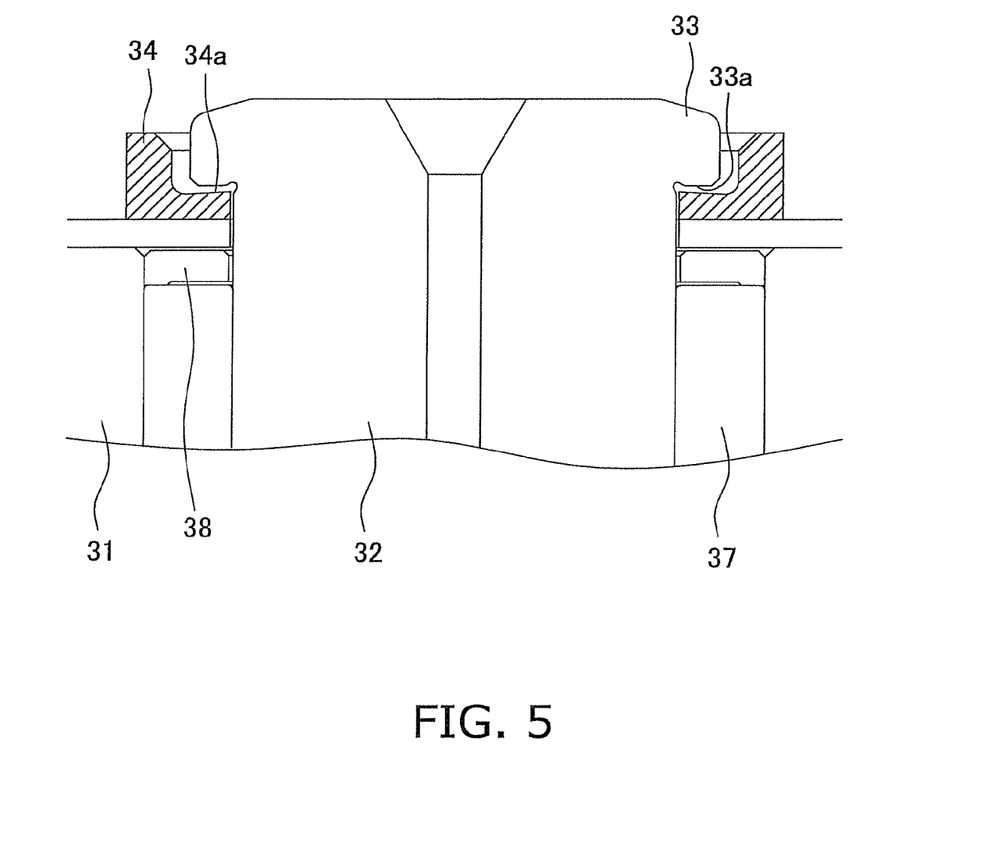
FIG. 5 is an enlarged cross-sectional view of a retainer structure disposed on the upper end portion of the pin included in the planetary gear mechanism illustrated in FIG. 3.
Figure 6:
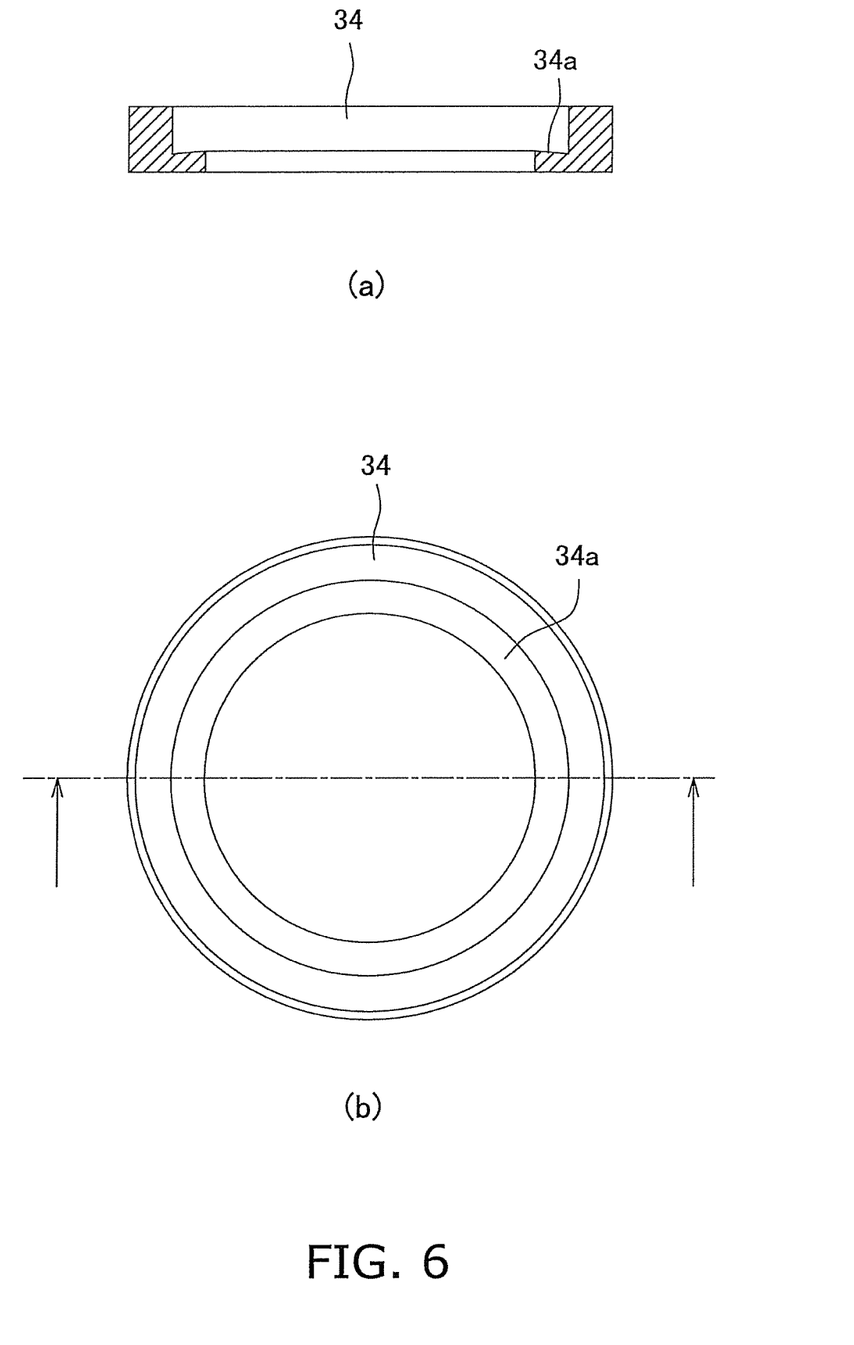
FIG. 6 includes a vertical cross-sectional view (a) and a plan view (b) for illustrating a structure of a plate member included in the planetary gear mechanism illustrated in FIG. 3.
Figure 7:
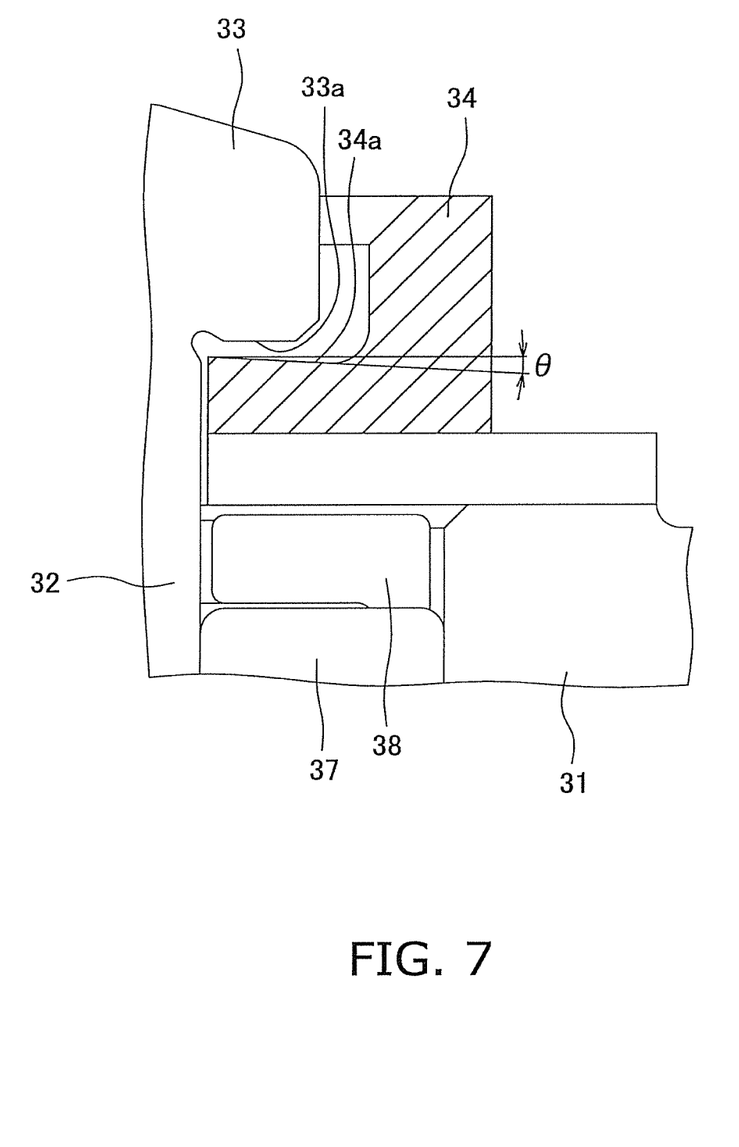
FIG. 7 is an enlarged cross-sectional view illustrating a positional relation between the plate member and a flanged portion of the upper end portion of the pin included in the planetary gear mechanism illustrated in FIG. 3.

As illustrated in FIGS. 5, 6 (a) and 6 (b), each plate member 34 is an annular member having a roughly L-shaped cross-section. Each plate member 34 is held by the contact surface 33a of the flanged portion 33 integrally formed with each pin 32 while being disposed on a face of each planet gear 31. Further, each plate member 34 includes the annular tapered portion (slanted surface) 34a making contact with the contact surface 33a of the flanged portion 33. The slanted surface of the tapered portion 34a is downwardly slanted from the radial inward to the radial outward. Therefore, the contact surface 33a of the flanged portion 33 and the surface of the tapered portion 34a of the plate member 34 make contact with each other while being slanted from each other. Accordingly, the contact portions of the both members make contact with each other at a slanted angle θ as illustrated in FIG. 7. Consequently, only the radial innermost portion of the contact surface 33a of the flanged portion 33 annularly makes contact with the tapered portion 34a of the plate member 34. In other words, the faced surfaces of the flanged portion 33 and the plate member 34 only partially make contact with each other (in a contact part). As a result, it is possible to minimize rotational friction force and rotational moment to be applied to the contact portion of each plate member 34 and that of the flanged portion 33 integrally formed with each pin 32 even when each plate member 34 is rotated in conjunction with rotation of each planet gear 31. It is thereby possible to prevent occurrence of problems such as locking of rotation of each planet gear 31 due to thermal deformation of or rotation-related detachment of the flanged portion 33 as the retainer portion.

Further, surface finishing is executed for the surface of the tapered portion 34a of each plate member 34. The surface finishing has a characteristic different from that of the surface finishing executed for the aforementioned area including the contact surface 33a of the flanged portion 33 integrally formed with each pin 32. Specifically, either a salt bath nitrided layer or a gas soft nitrided layer may be formed on the tapered portion 34a when a thermally hardened layer by means of high frequency heating, a hardened layer by means of carbo-nitriding or the like is formed on the contact surface 33a of the flanged portion 33. Accordingly, it is possible to enhance lubricating performance of the faced surfaces making contact with each other without producing adhesion therebetween.

The carrier 35 is a roughly disc-shaped member and supports each of the multiple planet gears 31 for allowing it to rotate about its axis.

The sun gear 36 is meshed with the respective planet gears 31 while being disposed in the center of the circularly aligned planet gears 31.

Procedure of Assembling Planetary Gear Mechanism 30

In the present exemplary embodiment, the aforementioned planetary gear mechanism 30 will be assembled in the following procedure.

First, the aforementioned processing (i.e., either of high frequency heating or carbo-nitriding) is executed for each pin 32 processed by means of lathe machining, and grinding is then executed for the outer periphery of each pin 32.

Next, the multiple planet gears 31, the plate members 34 are set on the carrier 35.

Subsequently, the pins 32, respectively having the flanged portion 33 integrally formed therewith, are press-fitted and fixed into the apertures formed in the carrier 35 while being inserted into the center openings penetrating through the components set on the carrier 35, i.e., the planet gears 31, the plate members 34 and the bearing portions 37.

Features

As illustrated in FIG. 5, the planetary gear mechanism 30 of the present exemplary embodiment includes the planet gears 31, the roughly cylindrical pins 32, the flanged portions 33 integrally formed with the upper end portions of the pins 32 and the roughly annular plate members 34. Each flanged portion 33 is protruded radial outwards from the upper end portion of each pin 32. Each flanged portion 33 is partially abutted to the radial inner portion of each plate member 34. Each plate member 34, disposed on a face of each planet gear 31, is fixed by the flanged portion 33 while receiving each pin 32 inserted therein.

With the structure, the flanged portion 33 and the plate member 34, attached to the upper end portion of each pin 32 functioning as the rotational shaft of each planet gear 31 for fixing each planet gear 31, can partially make contact with each other only in the radial inner portions of the faced surfaces thereof. Therefore, rotational force and rotational moment, related to rotation of the planet gears 31, can be further reduced than the well-known structure that the faced surfaces entirely make contact with each other. It is thereby possible to avoid occurrence of troubles such as burning-out and thermal deformation and prevent occurrence of problems such as locking of the planetary gear mechanism 30.

OTHER EXEMPLARY EMBODIMENTS

The exemplary embodiment of the present invention has been explained above. However, the present invention is not limited to the aforementioned exemplary embodiment and a variety of changes can be herein made without departing from the scope of the present invention.

(A) The aforementioned exemplary embodiment has been explained with an exemplary case that the flanged portion 33, integrally formed with the upper end portion of each pin 32, is used as the retainer portion of the present invention. In the present invention, however, the retainer portion is not limited to the above.

Figure 8:
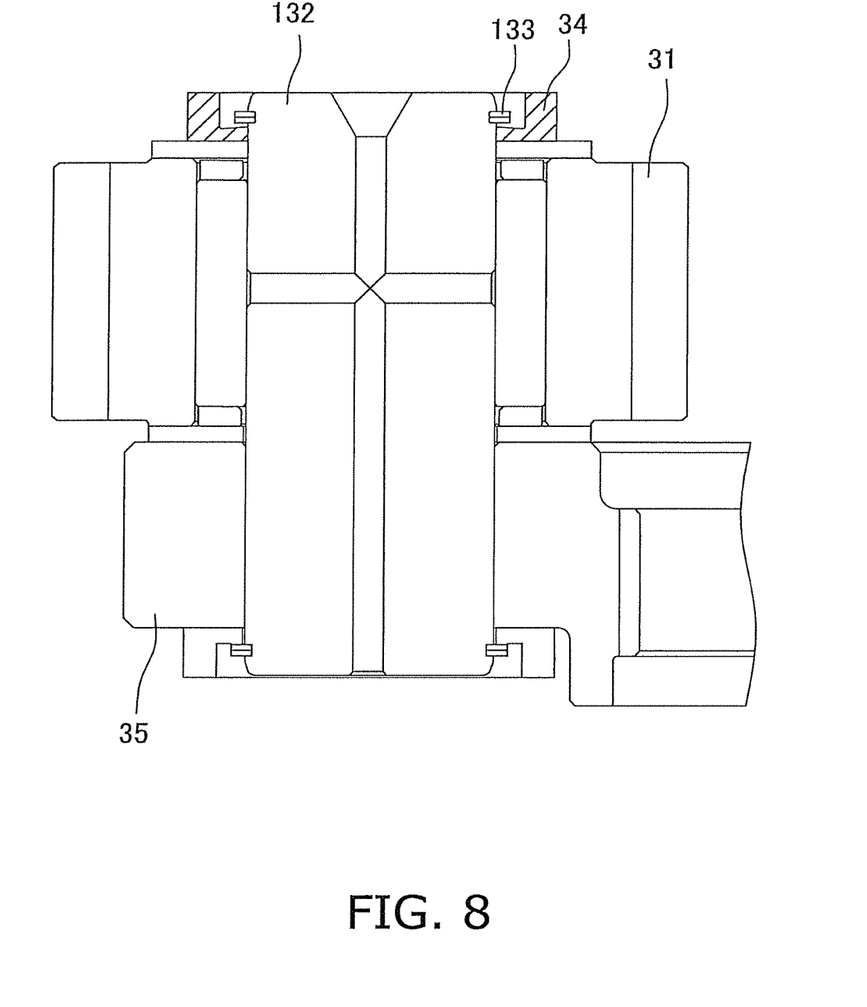
FIG. 8 is a cross-sectional view of a structure of a gear device according to another exemplary embodiment of the present invention.
Figure 9:
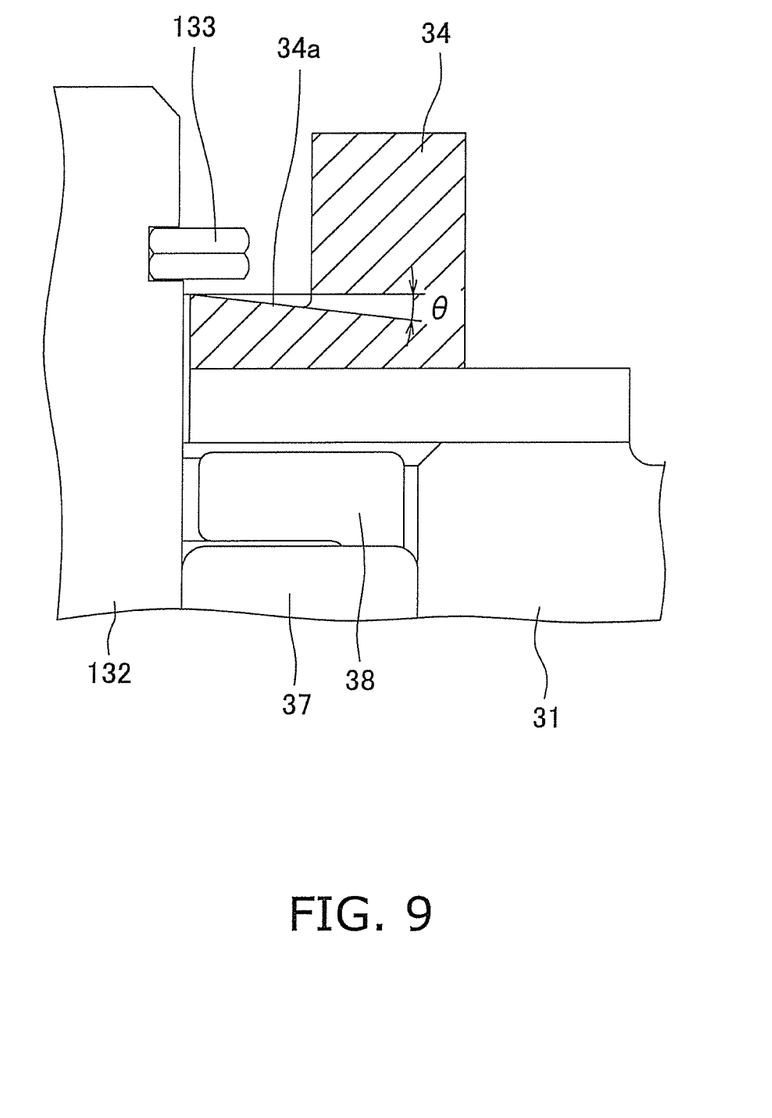
FIG. 9 is the cross-sectional view of the structure of the gear device according to the aforementioned "another" exemplary embodiment of the present invention.

As illustrated in FIGS. 8 and 9, for instance, a snap ring 133, a C-shaped snap ring or the like may be used as the retainer portion, and may be attached to the upper end portion of a roughly cylindrical pin 132 without a flanged portion by means of elastic deformation.

In this case, the following assembling procedure will be executed. First, each pin 132 is press-fitted and fixed into the carrier 35.

Next, the planet gear 31 and the plate member 34 are attached in this order onto each pin 132 press-fitted and fixed into the carrier 35.

Subsequently, the snap ring 133 is attached to an upper-end vicinity portion of each pin 132 for fixing the plate member 34.

Further, the tapered portion 34a of the plate member 34 is slanted with respect to the contact surface of the snap ring 133 at a slanted angle θ. Therefore, it is possible to reduce rotational force and rotational moment of the plate member 34 to be applied to the snap ring 133 compared to the well-known structure, even when the plate member 34 is rotated in conjunction with rotation of each planet gear 31. Consequently, it is herein possible to achieve the same advantageous effect as that achieved by the aforementioned exemplary embodiment, i.e., the advantageous effect of preventing occurrence of troubles such as detachment and thermal deformation of the snap ring 133.

(B) The aforementioned exemplary embodiment has been explained with an exemplary case that the tapered slanted surface is produced by slanting one of the contact surfaces (i.e., the tapered portion 34a of the plate member 34) with respect to the other in order to reduce the contact area between the plate member 34 and the flanged portion 33 (retainer portion) compared to that in the well-known structure. In the present invention, however, the structure for reducing the contact area is not limited to the above.

Figure 10:
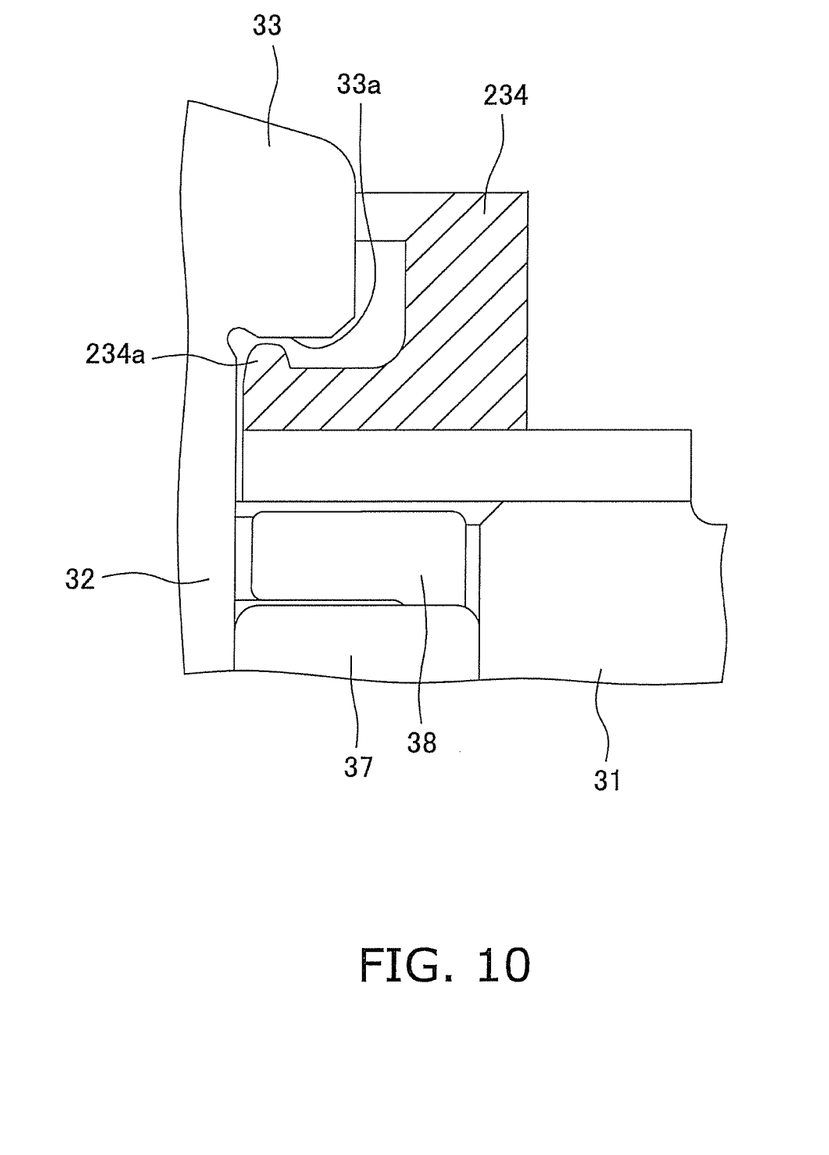
FIG. 10 is a cross-sectional view of a structure of a gear device according to yet another exemplary embodiment of the present invention.

As illustrated in FIG. 10, for instance, a convex portion 234a may be formed for producing the structure for reducing the contact area between the faced surfaces of a plate member 234 and the flanged portion 33 (retainer portion) without using the slanted surface. The convex portion 234a is herein formed on the inner peripheral portion of the plate member 234 and is protruded towards the contact surface 33a of the flanged portion 33.

It should be noted that the convex portion may be formed on either or both of the plate member and the retainer portion. Further, the contact surface of the convex portion may be a flat surface or a curved surface.

(C) The aforementioned exemplary embodiment has been explained with an exemplary case that the tapered slanted surface (i.e., the tapered portion 34a) is provided by slanting the contact surface of the plate member 34 with respect to the contact surface of the flanged portion 33 in order to reduce the contact area between the plate member 34 and the flanged portion 33 (retainer portion) compared to that in the well-known structure. In the present invention, however, the structure for reducing the contact area is not limited to the above.

Contrary to the above, for instance, the contact surface of the flanged portion may be slanted for reducing the contact area of the contact surface of the flanged portion with respect to the contact surface of the plate member compared to that in the well-known structure.

(D) The aforementioned exemplary embodiment has been explained with an exemplary case that the recess 33aa as an oil accumulating portion is formed on the surface of the contact surface 33a of the flanged portion 33 integrally formed with each pin 32.

In the present invention, however, the oil accumulating portion is not limited to the above.

For example, an oil accumulating recess may be formed on the surface of the plate member faced to the contact surface of the flanged portion. Alternatively, the oil accumulating recess may be formed on each of the contact surfaces of the flanged portion and the plate member.

(E) The aforementioned exemplary embodiment has been explained with an exemplary case that either high frequency heating or carbo-nitriding is executed for a predetermined region on the surface of each pin 32 in order to enhance the surface strength of each pin 32. In the present invention, however, the surface finishing to be executed for each pin 32 is not limited to the above.

For example, any other suitable processing such as carburizing may be employed as the surface finishing to be executed for the surfaces of the pins.

(F) The aforementioned exemplary embodiment has been explained with an exemplary case that the surface of the plate member 34 is processed by means of the surface finishing (i.e., either salt bath nitriding or gas soft nitriding) different from the surface finishing (i.e., either high frequency heating or carbo-nitriding) executed for the surface of the flanged portion 33 of each pin 32 in order to enhance the surface strength of the plate member 34. In the present invention, however, the surface finishing to be executed for the surface of the plate member 34 is not limited to the above.

For example, any other suitable processing excluding the above may be employed as the surface finishing to be executed for the surface of the plate member 34.

As described in the aforementioned exemplary embodiment, it is herein desirable to execute surface finishings with different characteristics for the contact surfaces of each pin 32 (i.e., the flanged portion 33) and the plate member 34 in the perspective of enhancement in lubricating performance therebetween.

(G) The aforementioned exemplary embodiment has been explained with an exemplary case that the present invention is applied to an exemplary gear device, i.e., the planetary gear mechanism 30 mounted in the speed reducer 21.

In the present invention, however, the gear device employing the present invention is not limited to the above.

For example, the present invention may be applied to the gear devices of the other types excluding the planetary gear mechanisms.

Further, the present invention may be applied to the gear devices mounted in the speed increasers excluding the gear mechanisms mounted in the speed reducers.

The gear device according to the illustrated embodiments can achieve an advantageous effect of preventing occurrence of troubles due to detachment, thermal deformation and so forth of a retainer member in conjunction with gear rotation. Therefore, the present invention can be widely applied to the gear devices mounted in a variety of speed reducers, speed increasers and so forth.

The invention claimed is:

1. A gear device comprising:
   a gear including an opening in a center part thereof;
   a roughly cylindrical pin inserted along and into the opening of the gear, the pin being a rotational center of the gear;
   a roughly annular plate member disposed on a face of the gear and attached along and onto an outer peripheral surface of the pin;
   a retainer portion disposed in a vicinity of an end portion of the pin, with the plate member being interposed between the retainer portion and the face of the gear;
   a contact part formed by faced surfaces of the retainer portion and the plate member facing in an axial direction of the pin with parts of the faced surfaces annularly making contact with each other in a position closest to an outer peripheral surface of the pin;
   a non-contact part formed by the faced surfaces of the retainer portion and the plate member with parts of the faced surfaces not making contact with each other in a position away from the outer peripheral surface of the pin;
   the retainer portion being a flanged portion integrally formed with the end portion of the pin, the flanged portion protruding outwards in a radial direction of the pin; and
   the pin including a thermally processed hardened layer in a region of the flanged portion including the faced surface that faces the plate member.

2. The gear device recited in claim 1, wherein
   one of the faced surfaces of the plate member and the retainer portion in the contact part includes a slanted surface slanted with respect to the other of the faced surfaces in the contact part.

3. The gear device recited in claim 2, wherein
   the slanted surface is formed on the faced surface of the retainer portion.

4. The gear device recited in claim 2, wherein
   the slanted surface is formed on the faced surface of the plate member, the slanted surface being downwardly slanted from inside to outside in a radial direction of the plate member.

5. The gear device recited in claim 1, wherein
   at least one of the faced surfaces of the plate member and the retainer portion in the contact part includes a convex portion.

6. The gear device recited in claim 5, wherein
   the convex portion is provided on an inner peripheral portion of the plate member and protrudes toward the faced surface of the retainer portion.

7. The gear device recited in claim 1, wherein
   at least one of the faced surfaces of the plate member and the retainer portion in the contact part includes a recess as an oil reservoir.

8. The gear device recited in claim 7, wherein
   the recess is at least one of a twill mark to be formed in grinding, a lathe machining groove, and a shot peening mark.

9. The gear device recited in claim 1, wherein
   the plate member includes a hardened layer on the faced surface that faces the flanged portion of the retainer portion, the hardened layer of the plate member having a characteristic different from a characteristic of the thermally processed hardened layer of the flanged portion.

10. The gear device recited in claim 1, wherein
    the contact part being disposed between the outer peripheral surface of the pin and the non-contact part in a radial direction from the pin.

11. The gear device recited in claim 1, wherein
    a recess for accumulating oil is formed in the faced surface of the flanged portion, and
    a slanted surface is formed on the faced surface of the plate member, the slanted surface being slanted with respect to the faced surface of the flanged portion such that the slanted surface diverges away from the faced surface of the flanged portion along a radially outward direction of the roughly cylindrical pin.

12. A gear device comprising:
    a gear including an opening in a center part thereof;
    a roughly cylindrical pin inserted along and into the opening of the gear, the pin being a rotational center of the gear;
    a roughly annular plate member disposed on a face of the gear and attached along and onto an outer peripheral surface of the pin;
    a retainer portion disposed in a vicinity of an end portion of the pin, with the plate member being interposed between the retainer portion and the face of the gear;
    a contact part formed by faced surfaces of the retainer portion and the plate member facing in an axial direction of the pin with parts of the faced surfaces annularly making contact with each other in a position closest to an outer peripheral surface of the pin;
    a non-contact part formed by the faced surfaces of the retainer portion and the plate member with parts of the faced surfaces not making contact with each other in a position away from the outer peripheral surface of the pin; and
    at least one of the faced surfaces of the plate member and the retainer portion in the contact part including a recess as an oil reservoir, the recess being at least one of a twill mark to be formed in grinding, a lathe machining groove, and a shot peening mark.

13. The gear device recited in claim 12, wherein
the retainer portion is a ring member attached to in the vicinity of the end portion of the pin by elastic deformation.

14. The gear device recited in claim 12, wherein
the contact part being disposed between the outer peripheral surface of the pin and the non-contact part in a radial direction from the pin.

* * * * *